US009276750B2

(12) United States Patent
Scarlata et al.

(10) Patent No.: US 9,276,750 B2
(45) Date of Patent: Mar. 1, 2016

(54) SECURE PROCESSING ENVIRONMENT MEASUREMENT AND ATTESTATION

(71) Applicants: Vincent R. Scarlata, Beaverton, OR (US); Carlos Rozas, Portland, OR (US); Simon Johnson, Beaverton, OR (US); Uday Savagaonkar, Portland, OR (US); Rebekah Leslie-Hurd, Portland, OR (US); Barry Huntley, Hillsboro, OR (US); Vedvyas Shanbhogue, Austin, TX (US); Ittai Anati, Haifa (IL); Francis McKeen, Portland, OR (US); Michael Goldsmith, Lake Oswego, OR (US); William Wood, Hillsboro, OR (US); Shay Gueron, Haifa (IL)

(72) Inventors: Vincent R. Scarlata, Beaverton, OR (US); Carlos Rozas, Portland, OR (US); Simon Johnson, Beaverton, OR (US); Uday Savagaonkar, Portland, OR (US); Rebekah Leslie-Hurd, Portland, OR (US); Barry Huntley, Hillsboro, OR (US); Vedvyas Shanbhogue, Austin, TX (US); Ittai Anati, Haifa (IL); Francis McKeen, Portland, OR (US); Michael Goldsmith, Lake Oswego, OR (US); William Wood, Hillsboro, OR (US); Shay Gueron, Haifa (IL)

(73) Assignee: Intel Corporation, Santa Clara, CA (US)

( * ) Notice: Subject to any disclaimer, the term of this patent is extended or adjusted under 35 U.S.C. 154(b) by 41 days.

(21) Appl. No.: 13/949,192

(22) Filed: Jul. 23, 2013

(65) Prior Publication Data
US 2015/0033012 A1 Jan. 29, 2015

(51) Int. Cl.
*H04L 29/06* (2006.01)
*H04L 9/32* (2006.01)

(52) U.S. Cl.
CPC ............. *H04L 9/3242* (2013.01); *H04L 9/3234* (2013.01); *H04L 2209/127* (2013.01)

(58) Field of Classification Search
CPC .......................... H04L 9/3242; H04L 63/123
USPC .......................................................... 713/161
See application file for complete search history.

(56) References Cited

U.S. PATENT DOCUMENTS

| 7,159,122 | B2* | 1/2007 | Lundvall et al. | 713/189 |
|---|---|---|---|---|
| 7,925,891 | B2* | 4/2011 | Crispin et al. | 713/190 |
| 8,782,388 | B2* | 7/2014 | Senda | 713/2 |
| 8,819,091 | B2* | 8/2014 | Inokuchi | G11B 27/10 707/822 |
| 2003/0110380 | A1* | 6/2003 | Carolsfeld et al. | 713/168 |
| 2004/0117625 | A1* | 6/2004 | Grawrock | 713/168 |
| 2005/0188216 | A1* | 8/2005 | Crispin et al. | 713/190 |
| 2006/0005015 | A1* | 1/2006 | Durham et al. | 713/164 |
| 2006/0069655 | A1* | 3/2006 | Athens et al. | 705/67 |
| 2007/0169179 | A1* | 7/2007 | Narad | 726/4 |
| 2011/0255690 | A1* | 10/2011 | Kocher et al. | 380/210 |
| 2014/0043059 | A1* | 2/2014 | Speers et al. | 326/9 |
| 2014/0079213 | A1* | 3/2014 | Jacobson et al. | 380/28 |
| 2014/0279985 | A1* | 9/2014 | Fontenot et al. | 707/698 |

OTHER PUBLICATIONS

Innovative Technology for CPU Based Attestation and Sealing|https://software.intel.com/sites/default/files/article/413939/hasp-2013-innovative-technology-for-attestation-and-sealing.pdf|Anati et al.|2013|pp. 1-7.*

* cited by examiner

*Primary Examiner* — Mahfuzur Rahman
(74) *Attorney, Agent, or Firm* — Thomas R. Lane

(57) ABSTRACT

Embodiments of an invention for secure processing environment measurement and attestation are disclosed. In one embodiment, a processor includes an instruction unit and an execution unit. The instruction unit is to receive a first instruction associated with a build or a rebuild of a secure enclave. The execution unit is to execute the first instruction. Execution of the first instruction, when associated with the build, includes calculation of a first measurement and a second measurement of the secure enclave. Execution of the first instruction, when associated with the rebuild, includes calculation of the second measurement without calculation of the first measurement.

8 Claims, 4 Drawing Sheets

METHOD 400

SECURE PROCESSING ENVIRONMENT MEASUREMENT AND ATTESTATION

BACKGROUND

1. Field

The present disclosure pertains to the field of information processing, and more particularly, to the field of security in information processing systems.

2. Description of Related Art

Confidential information is stored, transmitted, and used by many information processing systems. Therefore, techniques have been developed to provide for the secure handling and storing of confidential information. These techniques include various approaches to creating and maintaining a secured, protected, or isolated container, partition, or environment within an information processing system.

BRIEF DESCRIPTION OF THE FIGURES

The present invention is illustrated by way of example and not limitation in the accompanying figures.

DETAILED DESCRIPTION

Embodiments of an invention for secure processing environment measurement and attestation are described. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in the claims, unless otherwise specified the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, the terms "bits," "flags," "fields," "entries," etc., may be used to describe any type of storage location in a register, table, database, or other data structure, whether implemented in hardware or software, but are not meant to limit embodiments of the invention to any particular type of storage location or number of bits or other elements within any particular storage location.

As described in the background section, various approaches to creating and maintaining a secured, protected, or isolated container, partition, or environment within an information processing system have been developed. One such approach involves secure enclaves as described in the co-pending U.S. patent application entitled "Method and Apparatus to Provide Secure Application Execution," filed Jun. 19, 2012, Ser. No. 13/527,547, which provides information regarding at least one embodiment of a secured, protected, or isolated container, partition, or environment. However, this reference is not intended to limit the scope of embodiments of the invention in any way and other embodiments may be used while remaining within the spirit and scope of the present invention. Therefore, any instance of any secured, protected, or isolated container, partition, or environment used in any embodiment of the present invention may be referred to herein as a secure enclave or an enclave.

Figure 1:
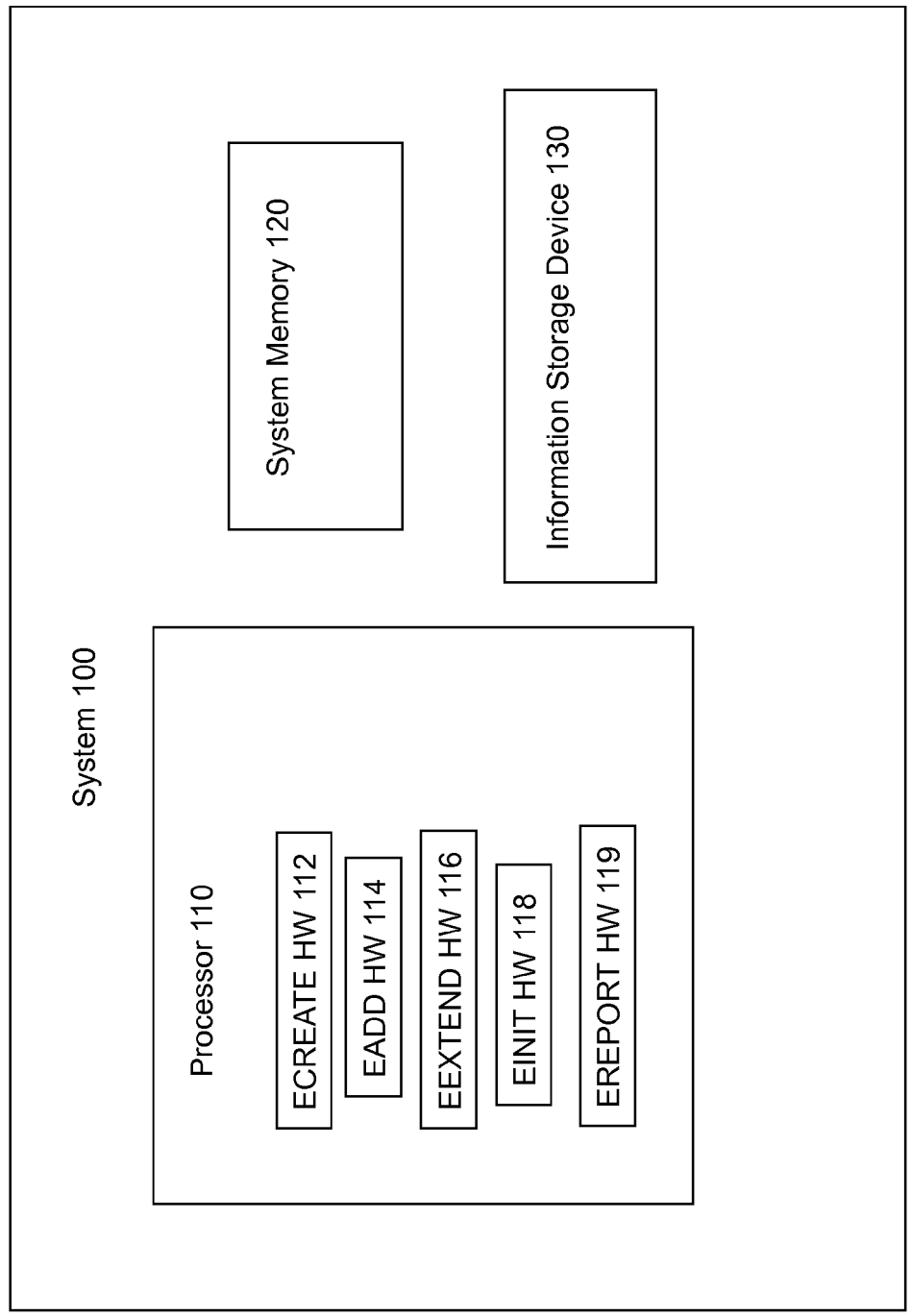
FIG. 1 illustrates a system for secure processing environment measurement and attestation according to an embodiment of the present invention.

FIG. 1 illustrates system 100, an information processing system for secure processing environment measurement and attestation according to an embodiment of the present invention. System 100 may represent any type of information processing system, such as a server, a desktop computer, a portable computer, a set-top box, a hand-held device such as a tablet or a smart phone, or an embedded control system. System 100 includes processor 110, system memory 120, and information storage device 130. Systems embodying the present invention may include any number of each of these components and any other components or other elements, such as peripherals and input/output devices. Any or all of the components or other elements in this or any system embodiment, may be connected, coupled, or otherwise in communication with each other through any number of buses, point-to-point, or other wired or wireless interfaces or connections, unless specified otherwise. Any components or other portions of system 100, whether shown in FIG. 1 or not shown in FIG. 1, may be integrated or otherwise included on or in a single chip (a system-on-a-chip or SOC), die, substrate, or package.

System memory 120 may be dynamic random access memory or any other type of medium readable by processor 110. Information storage device 130 may include any type of persistent or non-volatile memory or storage, such as a flash memory and/or a solid state, magnetic, or optical disk drive.

Processor 110 may represent one or more processors integrated on a single substrate or packaged within a single package, each of which may include multiple threads and/or multiple execution cores, in any combination. Each processor represented as or in processor 110 may be any type of processor, including a general purpose microprocessor, such as a processor in the Intel® Core® Processor Family, Intel® Atom® Processor Family, or other processor family from Intel® Corporation, or another processor from another company, or a special purpose processor or microcontroller.

Processor 110 may operate according to an instruction set architecture that includes a first instruction to create a secure enclave, a second instruction to add content to an enclave, a third instruction to measure content of an enclave, a fourth instruction to initialize an enclave, and a fifth instruction to generate a report of an enclave's content and/or identity. Although embodiments of the present invention may be practiced with a processor having any instruction set architecture and are not limited to the architecture of a processor family from Intel® Corporation, the instructions may be part of a set of software protection extensions to an existing architecture, and may be referred to herein as an ECREATE instruction, an EADD instruction, an EEXTEND instruction, an EINIT instruction, and an EREPORT instruction respectively. Support for these instructions may be implemented in a processor using any combination of circuitry and/or logic embedded in hardware, microcode, firmware, and/or other structures arranged as described below or according to any other approach, and is represented in FIG. 1 as ECREATE hardware 112, EADD hardware 114, EEXTEND hardware 116, EINIT hardware 118, and EREPORT hardware 119.

Figure 2:
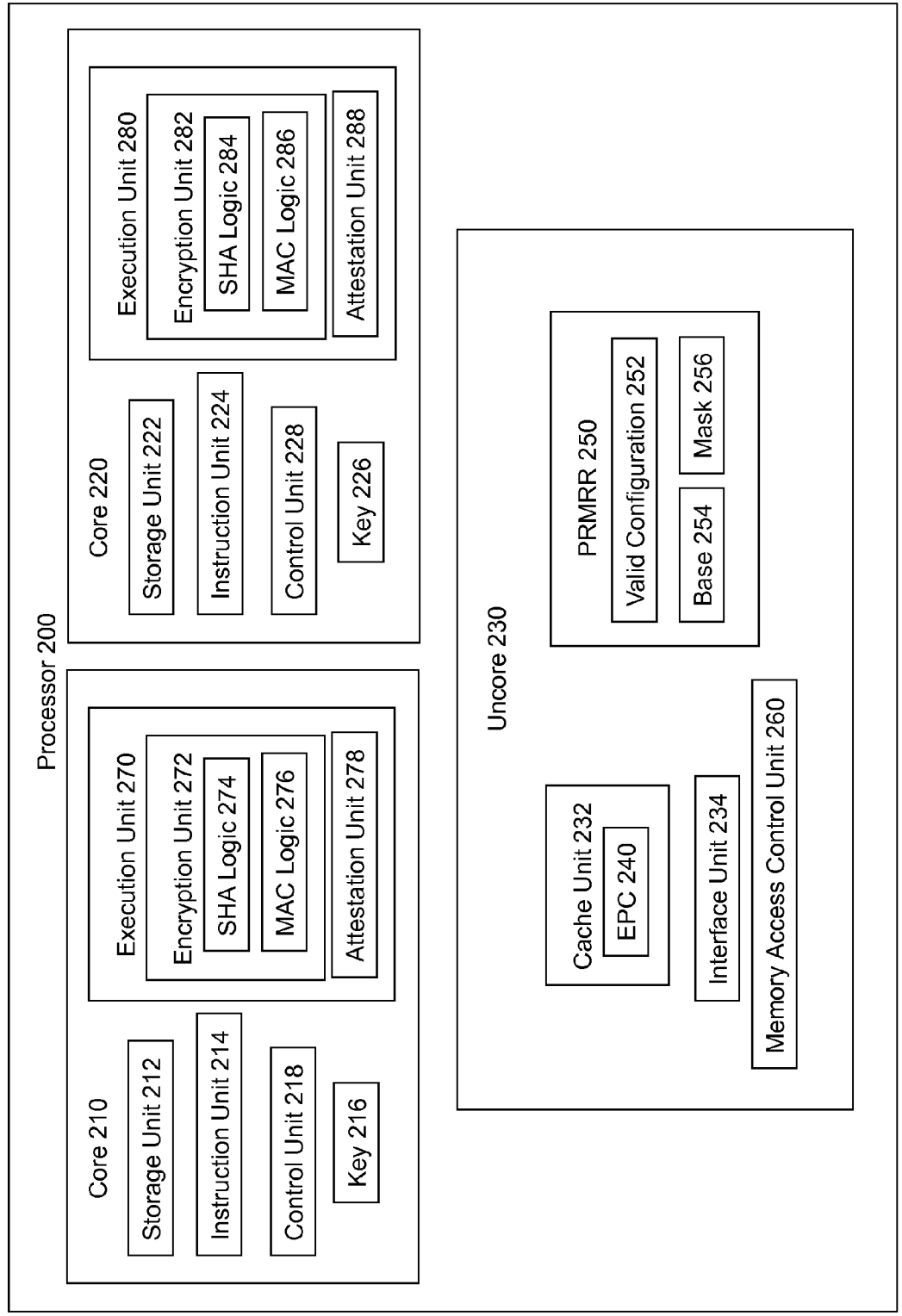
FIG. 2 illustrates a processor for secure processing environment measurement and attestation according to an embodiment of the present invention.

FIG. 2 illustrates processor 200, an embodiment of which may serve as processor 110 in system 100. Processor 200 may include core 210, core 220, and uncore 230. Core 210 may include storage unit 212, instruction unit 214, execution unit 270, control unit 218, and key 216. Core 220 may include storage unit 222, instruction unit 224, execution unit 290, control unit 228, and key 226. Uncore 230 may include cache unit 232, interface unit 234, processor reserved memory range registers 250, and memory access control unit 260. Processor 200 may also include any other circuitry, structures, or logic not shown in FIG. 2. The functionality of the ECREATE hardware 112, the EADD hardware 114, the EEXTEND hardware 116, the EINIT hardware 118, and the EREPORT hardware 119, as introduced above and further described below, may be distributed among any of the labeled units or elsewhere in processor 200.

Storage units 212 and 222 may include any combination of any type of storage usable for any purpose within cores 210 and 220, respectively; for example, they may include any number of readable, writable, and/or read-writable registers, buffers, and/or caches, implemented using any memory or storage technology, for storing capability information, configuration information, control information, status information, performance information, instructions, data, and any other information usable in the operation of cores 210 and 220, respectively, as well as circuitry usable to access such storage.

Instruction units 214 and 224 may include any circuitry, logic, structures, and/or other hardware for fetching, receiving, decoding, interpreting, and/or scheduling instructions to be executed by cores 210 and 220, respectively. Any instruction format may be used within the scope of the present invention; for example, an instruction may include an opcode and one or more operands, where the opcode may be decoded into one or more micro-instructions or micro-operations for execution by execution unit 216 or 226, respectively. Instructions, such as the ECREATE, EADD, EEXTEND, and EINIT instructions, may be leaves of a single opcode, such as a privileged secure enclave opcode (e.g., ENCLS), where the leaf instructions are specified by the value in a processor register (e.g., EAX). Instructions, such as the EREPORT instruction, may be also be leaves of a single opcode, such as an unprivileged secure enclave opcode (e.g., ENCLU), where the leaf instructions are also specified by the value in a processor register (e.g., EAX). Operands or other parameters may be associated with an instruction implicitly, directly, indirectly, or according to any other approach.

Execution units 270 and 280 may include any circuitry, logic, structures, and/or other hardware, such as arithmetic units, logic units, floating point units, shifters, etc., for processing data and executing instructions, micro-instructions, and/or micro-operations. Execution units 270 and 280 may include dedicated circuitry, logic, structures, and/or other hardware for measuring data according to embodiments of the present invention or any such measurements may be performed with shared circuitry, logic, structures, and/or other hardware in execution unit 270 and 280 and/or elsewhere in processor 200. Execution units 270 and 280 may include encryption units 272 and 282 respectively. Execution units 216 and 226 may also include attestation units 278 and 288, respectively.

Encryption units 272 and 282 may represent any circuitry, logic, structures, and/or other hardware to execute any one or more encryption algorithm, the corresponding decryption algorithms, and/or hashing algorithms. Encryption units 272 and 282 may include SHA logic 274 and 284, respectively, to implement a secure hash algorithm such as SHA-256, SHA-512, SHA-3, or SM3, and/or MAC logic 276 and 286, respectively, to generate a method authentication code (MAC), such as an Advanced Encryption Standard Cipher-based MAC (AES-CMAC), and/or any of SHA logic 274, SHA logic 284, MAC logic 276, and MAC logic 286 may represent any dedicated or shared circuitry, logic, structures, and/or other hardware elsewhere in processor 200 to perform these functions. For calculating MACs, MAC logic 276 and 286 may use key 216 and 226, respectively, each of which may represent any key, such as a processor or platform unique key programmed into processor 200 in a fuse array, generated during a boot process, and/or otherwise available as a secret key to be used in a MAC algorithm or for any other purpose.

Attestation units 278 and 288 may include any circuitry, logic, structures, and/or other hardware to attest to the content, identity, and/or authenticity of a secure enclave, such that it may be trusted by entities (e.g., application software or a user of application software) operating outside the enclave (an "external entity"), as further described below.

Control units 218 and 228 may include any microcode, firmware, circuitry, logic, structures, and/or other hardware to control the operation of the units and other elements of cores 210 and 220, respectively, and the transfer of data within, into, and out of cores 210 and 220. Control units 218 and 228 may cause cores 210 and 220 and processor 200 to perform or participate in the performance of method embodiments of the present invention, such as the method embodiments described below, for example, by causing cores 210 and 220 to execute instructions received by instruction units 214 and 224 and micro-instructions or micro-operations derived from instructions received by instruction units 214 and 224.

Cache unit 232 may include any number of cache arrays and cache controllers in one or more levels of cache memory in a memory hierarchy of information processing system 100, implemented in static random access memory or any other memory technology. Cache unit 232 may be shared among any number of cores and/or logical processors within processor 200 according to any approach to caching in information processing systems. Cache unit 232 may also include one or more memory arrays to be used as enclave page cache (EPC) 240 as further described below.

Interface unit 234 may represent any circuitry, logic, structures, and/or other hardware, such as a link unit, a bus unit, or a messaging unit to allow processor 200 to communicate with other components in a system such as system 200 through any type of bus, point to point, or other connection, directly or through any other component, such as a bridge, hub, or chipset. Interface unit 234 may include one or more integrated memory controllers to communicate with a system memory such as system memory 120 or may communicate with a system memory through one or more memory controllers external to processor 200.

Processor reserved memory range registers (PRMRR) 250 may represent any one or more storage locations in storage units 212 and 222, elsewhere in processor 200, and/or copies thereof in uncore 230. PRMRR 250 may be used, for example by configuration firmware such as a basic input/output system, to reserve one or more physically contiguous ranges of memory called processor reserved memory (PRM). Memory access control unit 260 may represent any circuitry, structures, logic, and/or other hardware anywhere in processor 200 that may control access to PRM such that EPC 240 may be created within the system memory space defined as PRM.

In an embodiment, PRM is of a size that is an integer power of two, e.g. 32 MB, 64 MB, or 128 MB, and is aligned to a memory address that is a multiple of that size. PRMRR 250 may include one or more instances of a read-only PRMMR valid configuration register 252 to indicate the valid sizes to which PRM may be configured, one or more instances of a PRMMR base register 254 and a PRMMR mask register 256 to define one or more base addresses and ranges of PRM.

EPC 240 is a secure storage area in which software may be protected from attacks by malware operating at any privilege level. One or more secure enclaves may be created such that each enclave may include one or more pages or other regions of EPC 240 in which to store code, data, or other information in a way that it may only be accessed by software running inside that enclave. For example, a secure enclave may be used by a software application so that only that software application, while running inside that enclave, may access the contents of that enclave. No other software, not even an operating system or a virtual machine monitor, may read the unencrypted contents of that enclave, modify the contents of that enclave, or otherwise tamper with the contents of that enclave while the content is loaded into the EPC (assuming that the enclave is a production enclave, as opposed to, for example, a debug enclave). However, the contents of the enclave may be accessed by software executing from within that enclave on any processor in system 100. This protection is accomplished by the memory access control unit 260 operating according to the secure enclaves architecture.

In FIG. 2, EPC 240 is shown in cache unit 232, where it may be a sequestered portion of a shared cache or a dedicated memory. Within or on the same die as processor 200, EPC 240 may be implemented in static random access memory, embedded dynamic random access memory, or any other memory technology. EPC 240 may also or additionally be implemented external to processor 200, for example within a secure region of system memory 120. To protect the content of secure enclaves when it is not stored on-die, encryption units 272 and/or 282 may be used to encrypt the content before it is transferred off-die and to decrypt the content transferred back into EPC 240 on-die. Other protection mechanisms may also be applied to protect the content from replay and other attacks.

Figure 3:
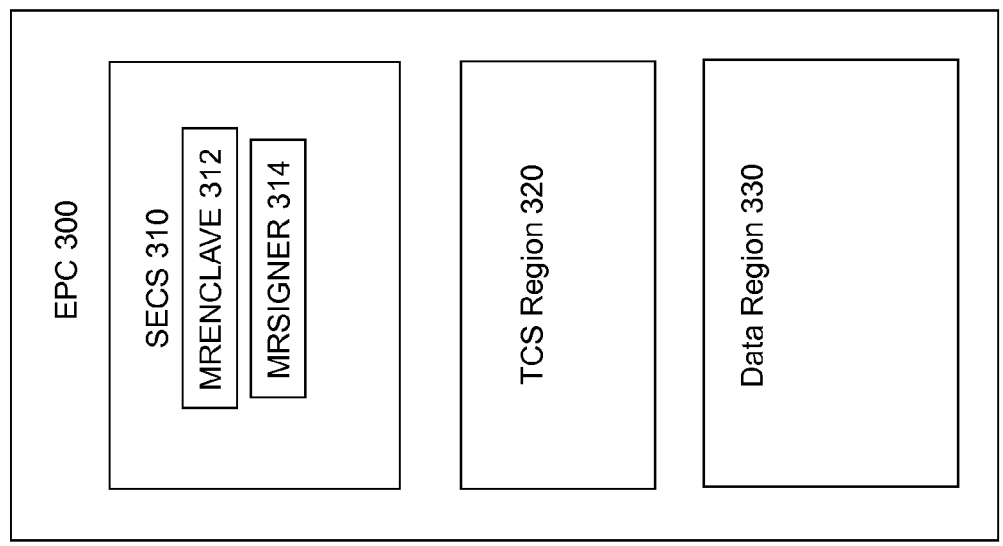
FIG. 3 illustrates an enclave page cache according to an embodiment of the present invention.

FIG. 3 illustrates EPC 300, an embodiment of which may serve as EPC 240 in FIG. 2. In FIG. 3, EPC 300 includes secure enclave control structure (SECS) 310, thread control structure (TCS) region 320, and data region 330. Although FIG. 3 shows EPC 300 divided into three separate regions, EPC 300 may be divided into any number of chunks, regions, or pages, each of which may be used for any type of content. In one embodiment, it is divided into 4 kilobyte (KB) pages and is aligned to an address in system memory 120 that is a multiple of 4 KB, SECS 310 may be any one of the 4 KB pages in EPC 300, TCS region 320 may be any number of contiguous or non-contiguous 4 KB pages, and data region 330 may be any number of contiguous or non-contiguous 4 KB pages. Furthermore, although FIG. 3 shows one SECS, one TCS region, and one data region corresponding to one secure enclave, an EPC may include any number of SECS and any number of TCS and data regions, so long as each enclave has one and only one SECS, each valid TCS and valid data region (e.g., page) belongs to one and only one enclave, and all of the SECS, TCS, and data pages fit within the EPC (or may be paged out of and back into the EPC).

An SECS is created by the execution of the ECREATE instruction to contain metadata to be used by hardware, and accessible only by hardware (i.e., not readable, writable, or otherwise accessible by software, whether running inside or outside the enclave), to define, maintain, and protect the enclave. For example, SECS 310 includes a first measurement register (MRENCLAVE) 312, which may be any size field within SECS 310; in one embodiment, MRENCLAVE 312 may be 32 bytes. MRENCLAVE 312 is to store the build measurement value of the enclave, which is initialized by the ECREATE instruction, updated by every EADD and EEXTEND instruction associated with the enclave, and locked by the EINIT instruction associated with the enclave. SECS 310 also includes a second measurement register (MRSIGNER) 314 to store a measurement of an identifier, such as a public key, of the entity that verified the creation of the enclave. In one embodiment, MRSIGNER 314 may be 32 bytes.

One or more TCSs may also be associated with a secure enclave. A TCS contains metadata used by the hardware to save and restore thread specific information when entering and exiting the enclave.

The security attributes of each page are stored in a microarchitectural data structure called an enclave page cache map (EPCM) that is used by memory access control unit 260 to enforce the protections provided by the secure enclaves architecture. The EPCM stores one entry for each page in the EPC. Each entry includes an identifier (e.g., a 64 bit field) of the SECS (i.e., the enclave) to which the page belongs. These identifiers may be referred to by secure enclaves instructions, such as EADD, EEXTEND, and EINIT, to provide for the SECS to be read by hardware in order to execute the instruction.

Figure 4:
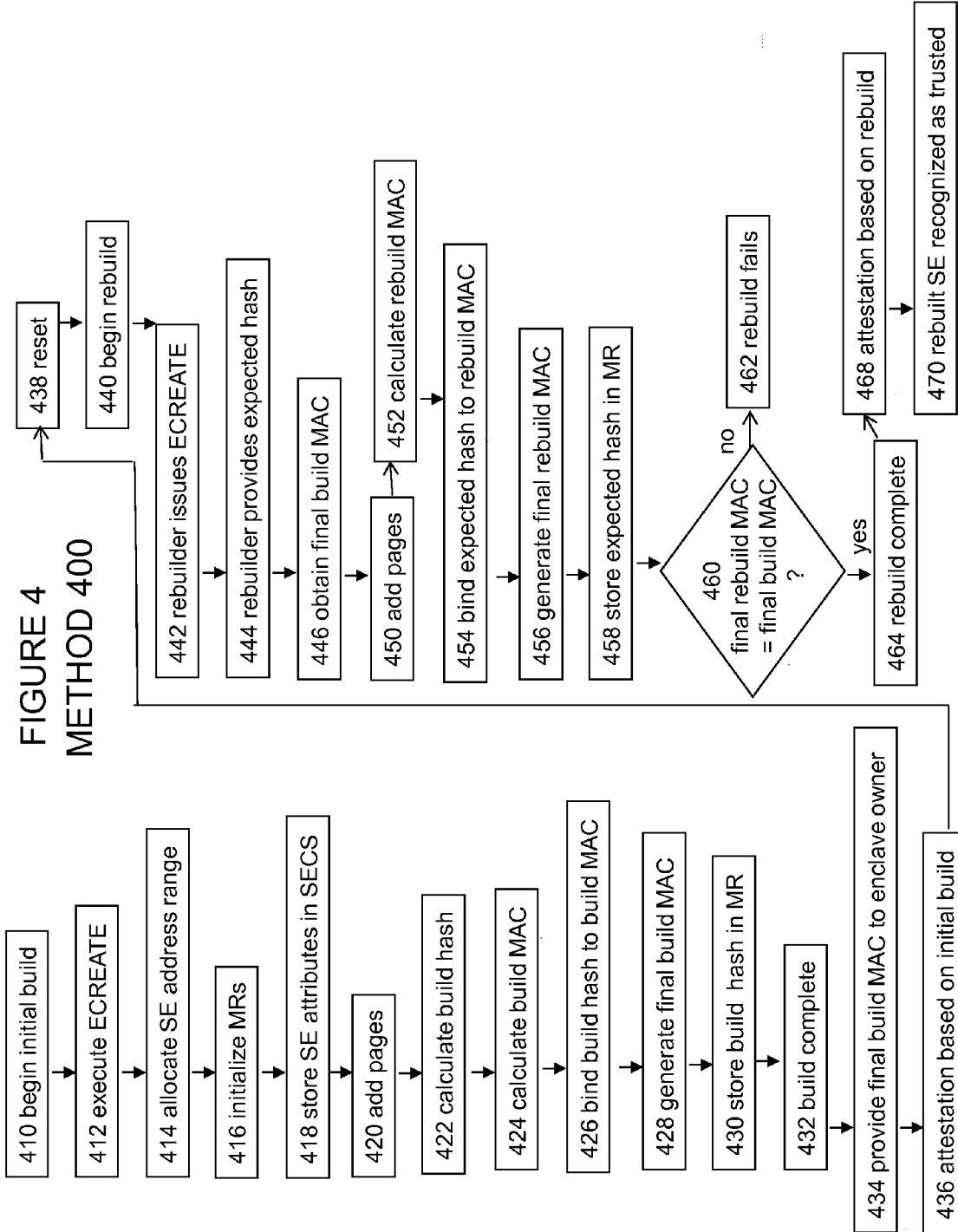
FIG. 4 illustrates a method for secure processing environment measurement and attestation according to an embodiment of the present invention.

FIG. 4 illustrates method 400, a method for secure processing environment measurement and attestation according to an embodiment of the present invention. Although method embodiments of the invention are not limited in this respect, reference may be made to elements of FIGS. 1, 2, and 3 to help describe the method embodiment of FIG. 4.

As will be further explained in the description of FIG. 4, embodiments of the present invention provide for measuring a secure enclave, such that the measurement may be used in one or more enclave protection mechanisms, and attesting to the content, identity, and/or authenticity of a secure enclave, such that it may be trusted by external entities. Measuring a secure enclave may include calculating, generating, or deriving a cryptographic hash, log, or other value based on the content of the enclave, amount of memory (e.g., number of EPC pages), relative location of each page, and/or any other attributes of the enclave or its content. The measurement may be used like a fingerprint of the enclave, to provide assurance of the identity and proper construction of the enclave, in the generation of one or more cryptographic keys to encrypt and/or seal enclave data, in the generation of a digital signature or certificate to attest to the identity or and/or integrity of an application running inside the enclave, and/or for any other purpose.

In one embodiment of the present invention, a measurement of an enclave may be generated in two different ways, for example, by calculating a hash (e.g., SHA-256) and by calculating a MAC (e.g., AES-CMAC). Typically, a MAC may be calculated in less time than a hash, but requires a secret key, which means that an external entity may independently calculate the hash but not the MAC. Therefore, embodiments provide for an enclave to be measured in both ways the first time that it is built on a platform (e.g., system 100), and measured in only one way (e.g., by calculating a MAC) when it is subsequently built. For example, the initial launch of a software application to be run in a secure enclave on system 100 may result in the generation of a hash and a MAC of the secure enclave as it is built, and any subsequent launch of that software application on system 100 (e.g., after a reset or power-down) may result in the generation of the MAC but not the hash of the secure enclave as it is built.

In addition to showing the measurement and attestation of a secure enclave, method 400 shows as the creation, addition of pages to, and initialization of the enclave. Method 400 includes the building of a secure enclave using ECREATE, EADD, EEXTEND, and EINIT instructions; however, embodiments of the present invention are not limited to these specifically named instructions. In method 400, these instructions may be issued, invoked, or otherwise used by privileged system software, such as an operating system or a virtual machine monitor. Method 400 also include the use of an EREPORT instruction, which may be issued, invoked, or otherwise used by unprivileged application software running within the enclave. Embodiments of the present invention such as method 400 may be desirable because they may reduce the build latency of a secure enclave after an initial build.

In box 410, an initial build of a secure enclave on system 100 begins. In box 412, an ECREATE instruction is executed, for example by execution unit 270 or 280. In one embodiment, execution of the ECREATE instruction includes, in box 414, the allocation of a range of addresses for use by the secure enclave. In one embodiment, the addresses may be a first type of address, for example a virtual or linear addresses, to be translated to a second type of address, for example a physical address in a system memory such as system memory 120. Execution of the ECREATE instruction may also include, in box 416, initializing the values of MRENCLAVE 312 and MRSIGNER 314; in one embodiment, the initial value for MRENCLAVE 312 may be a value specified by the Federal Information Processing Standard (FIPS) for a secure hash algorithm (SHA) and the initial value for MRSIGNER 314 may be zero. Execution of the ECREATE instruction may also include, in box 418, establishing other attributes of the enclave and storing the enclave attributes in an SECS.

In box 420, one or more pages (or other regions) may be added to the enclave and measured, for example by the execution of one or more EADD and one or more EEXTEND instructions. Adding a page to the enclave may include copying a source page from system memory into the EPC and associating the EPC page with the enclave's SECS. The source page may be a regular page containing unencrypted code, data, or other information for the data region of the enclave, or the source page may be a TCS page containing data for the TCS region.

In box 422, a build hash (e.g., SHA-256) of the added page or pages is calculated. In one embodiment, the build hash may be calculated incrementally, for example, by extending or updating an intermediate hash of previously added pages and/or subregions of pages (e.g., for each execution of an EEXTEND instruction). The build hash may be based on the content, location, and/or other attributes of the page or pages.

In box 424, a MAC of the added page or pages is calculated. In one embodiment, the MAC may be calculated incrementally, for example, by extending or updating an intermediate MAC of previously added pages and/or subregions of pages (e.g., for each execution of an EEXTEND instruction). The MAC may be based on the content, location, and/or other attributes of the page or pages.

In box 426, the build hash of the enclave is bound, appended, or otherwise combined with the MAC of the enclave. In one embodiment, the MAC may be updated or extended with a MAC of the build hash. Box 426 may be performed after all pages have been added and measured, for example, as part of the execution of an EINIT instruction.

In box 428, execution of the EINIT instruction may also include updating or extending the MAC with a signature or other certification that represents the identity of the creator or verifier of the enclave, along with any other security properties of the enclave, to generate the final MAC of the enclave (the "final build MAC"). The signature may be provided by the creator or verifier of the enclave, verified by processor 200 as part of the execution of the EINIT instruction, and stored in MRSIGNER 314.

In box 430, the build hash may be stored in MRENCLAVE 312, which may also be used to store intermediate hashes during box 422. In other embodiments, the final build hash may be stored elsewhere.

In box 432, the build is complete. In box 434, the final build MAC may be provided to the creator or owner of the enclave (e.g., returned to the caller) or stored elsewhere.

In box 436, an attestation of the content of the enclave may be performed using the build hash. The attestation may be provided to an external entity as part of the execution of an EREPORT instruction.

In box 438, system 100 is powered off and back on, reset, or the enclave is otherwise closed and launched again.

In box 440, a subsequent build of the secure enclave on system 100 begins. In box 442, the entity rebuilding the enclave issues an ECREATE instruction. In box 444, the entity provides a hash of the content that is to be added to the enclave (the "expected hash"). The entity may obtain this hash by reading an attestation of the initial build (from box 436) or by calculating it (e.g., based on the pages to be added during the rebuild). In box 446, the final build MAC is obtained, for example, by being provided by the rebuilding entity (if provided to the entity in box 434) or by being retrieved from storage (if stored in box 434).

In box 450, one or more pages (or other regions) may be added to the enclave and measured, for example by the execution of one or more EADD and one or more EEXTEND instructions. The EADD, EEXTEND, or other instructions used to rebuild the enclave may have an associated parameter to indicate that the build is subsequent to an initial build, or any other approach to indicating that the build is subsequent to an initial build may be used. One or more of the instructions used to rebuild the enclave may be used by the entity performing the rebuild to provide the expected hash, the final build MAC, and any other security properties of the enclave.

In box 452, a MAC of the added page or pages is calculated. In one embodiment, the MAC may be calculated incrementally, for example, by extending or updating an intermediate MAC of previously added pages and/or subregions of pages (e.g., for each execution of an EEXTEND instruction). The MAC may be based on the content, location, and/or other attributes of the page or pages.

In box 454, the expected hash is bound, appended, or otherwise combined with the MAC of the enclave calculated in box 452. In one embodiment, the MAC may be updated or extended with a MAC of the expected hash.

In box 456, execution of the EINIT instruction may include updating or extending the MAC with a signature or other certification that represents the identity of the creator or verifier of the enclave, along with any other security properties of the enclave, to generate the final MAC of the rebuilt enclave (the "final rebuild MAC"). The signature may be provided by the creator or verifier of the enclave, verified by processor 200 as part of the execution of the EINIT instruction, and stored in MRSIGNER 314.

In box 458, the expected hash may be stored in MRENCLAVE 312.

In box 460, the final rebuild MAC calculated in box 456 is compared to the final build MAC obtained in box 446. If these MACs match, then method 400 continues in box 464. If not, then method 400 continues in box 462.

In box 462, the rebuild fails (e.g., signals an error, fault, or other such condition).

In box 464, the rebuild is complete.

In box 468, an attestation of the content of the enclave may be performed using the expected hash. The attestation may be provided to an external entity as part of the execution of an EREPORT instruction. To an external entity, the attestation resulting from box 468 is indistinguishable from the attestation resulting from box 436. In box 470, the external entity may recognize the application running is the secure enclave as trusted, based on the attestation.

In various embodiments of the present invention, the method illustrated in FIG. 4 may be performed in a different order, with illustrated boxes combined or omitted, with additional boxes added, or with a combination of reordered, combined, omitted, or additional boxes. Furthermore, many other method embodiments are possible within the scope of the present invention.

Embodiments or portions of embodiments of the present invention, as described above, may be stored on any form of a machine-readable medium. For example, all or part of method 400 may be embodied in software or firmware instructions that are stored on a medium readable by processor 110, which when executed by processor 110, cause processor 110 to execute an embodiment of the present invention. Also, aspects of the present invention may be embodied in data stored on a machine-readable medium, where the data represents a design or other information usable to fabricate all or part of processor 110.

Thus, embodiments of an invention for secure processing environment measurement and attestation have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
    instruction hardware to receive a first instruction and a second instruction, the first instruction associated with one of a build and a rebuild of a secure enclave, wherein the first instruction, when associated with the rebuild, provides an expected hash; and
    execution hardware to execute the first instruction and the second instruction, wherein execution of the first instruction, when associated with the build, includes calculation of a calculated hash of the secure enclave and calculation of a message authentication code of the secure enclave, and when associated with the rebuild, includes obtaining the message authentication code calculated during the build, calculation of the message authentication code without calculation of the calculated hash, and comparing the message authentication code calculated during the rebuild to the message authentication code calculated during the build, and wherein execution of the second instruction includes attesting to content of the secure enclave using one of the calculated hash and the expected hash.

2. The processor of claim 1, further including a key, wherein calculation of the message authentication code is performed using the key.

3. The processor of claim 1, wherein execution of the first instruction, when associated with the rebuild, also includes calculating the message authentication code based on the expected hash.

4. The processor of claim 1, wherein calculation of the calculated hash is based on SHA-256.

5. A method comprising:
    invoking a first instruction to measure an initial build of a secure enclave;
    executing, by execution hardware in a processor, the first instruction to measure the initial build, including calculating a calculated hash of the secure enclave and calculating a message authentication code of the secure enclave;
    storing the calculated hash in a measurement register in a cache protected by the processor from access except by software executing from within the secure enclave;
    invoking the first instruction to measure a subsequent build of the secure enclave, the first instruction providing an expected hash;
    executing, by the execution hardware in the processor, the first instruction to measure the subsequent build, including obtaining the message authentication code calculated during the initial build, calculating the message authentication code without calculation of the calculated hash, and comparing the message authentication code calculated during the subsequent build to the message authentication code calculated during the initial build;
    invoking a second instruction to attest to content of the secure enclave; and
    executing, by the execution hardware in the processor, the second instruction to attest to content of the secure enclave using one of the calculated hash and the expected hash.

6. The method of claim 5, wherein calculating the calculated message authentication code is performed using a key.

7. The method of claim 5, wherein calculating the calculated message authentication code in response to the first instruction, when associated with the subsequent build, includes calculating the message authentication code based on the expected hash.

8. A system comprising:
    a system memory; and
    a processor including
        an instruction unit to receive a first instruction and a second instruction, the first instruction associated with one of a build and a rebuild of a secure enclave using data from the system memory, wherein the first instruction, when associated with the rebuild, provides an expected hash; and
        an execution unit to execute the first instruction and the second instruction, wherein execution of the first instruction, when associated with the build, includes calculation of a calculated hash of the secure enclave and calculation of a message authentication code of the secure enclave, and when associated with the rebuild, includes obtaining the message authentication code calculated during the build, calculation of the message authentication code without calculation of the calculated hash, and comparing the message authentication code calculated during the rebuild to the message authentication code calculated during the build, and wherein execution of the second instruction includes attesting to content of the secure enclave using one of the calculated hash and the expected hash.

* * * * *